April 4, 1967 E. C. BROWNING 3,312,247
SINGLE HANDLE FAUCET
Filed Sept. 24, 1964 2 Sheets-Sheet 2
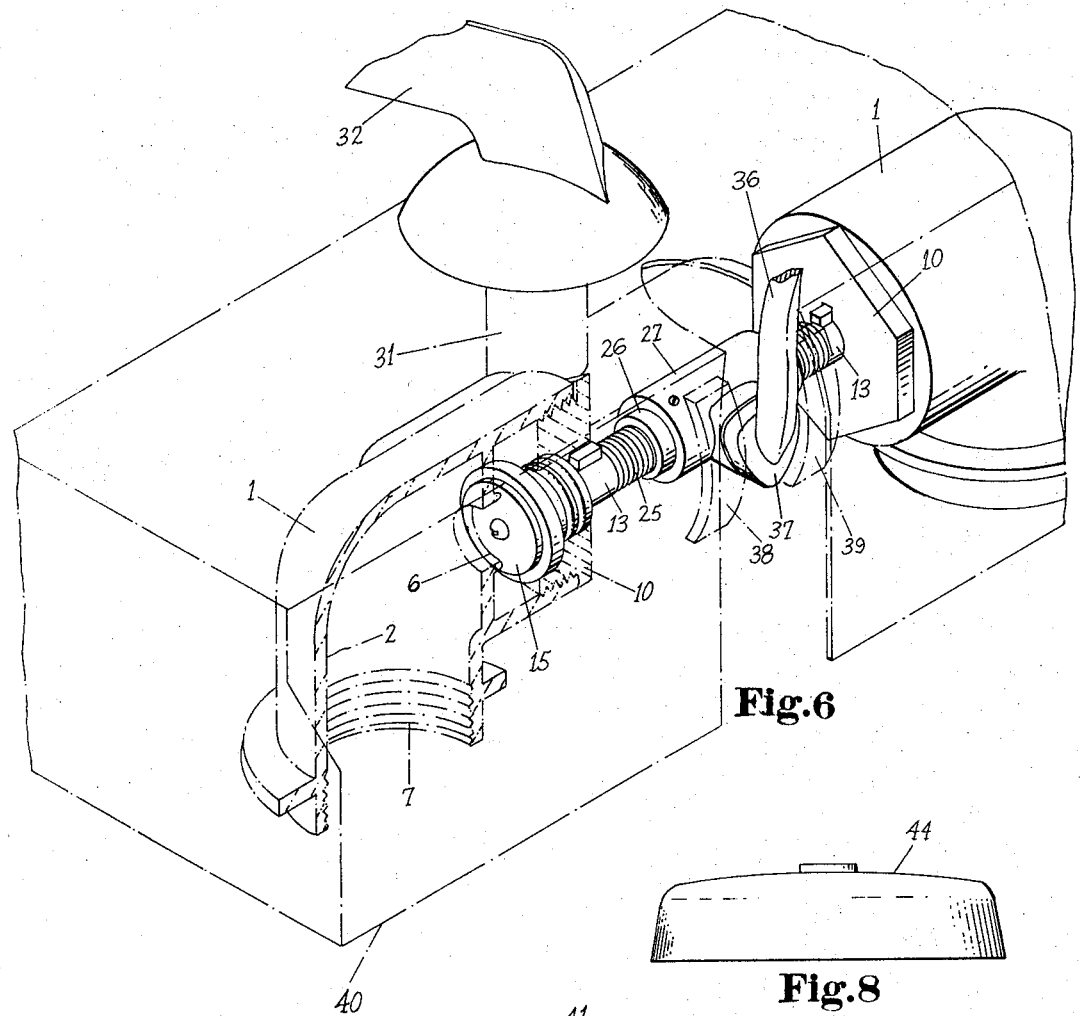
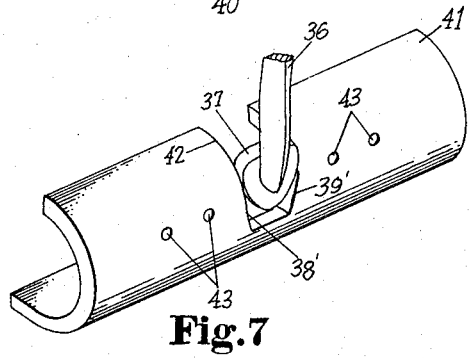
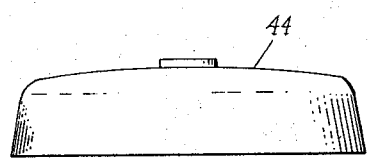
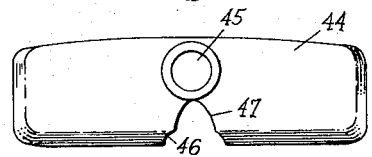
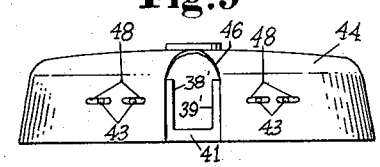
INVENTOR.
ERNEST C. BROWNING,
BY Jungblut, Melville,
Strasser & Foster
ATTORNEYS.

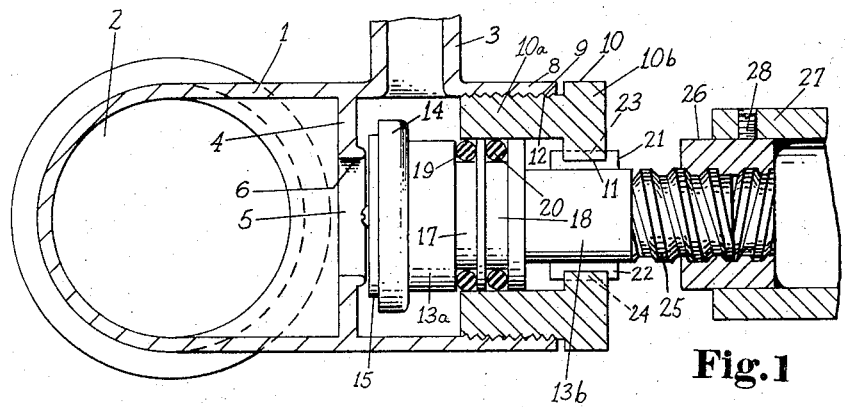
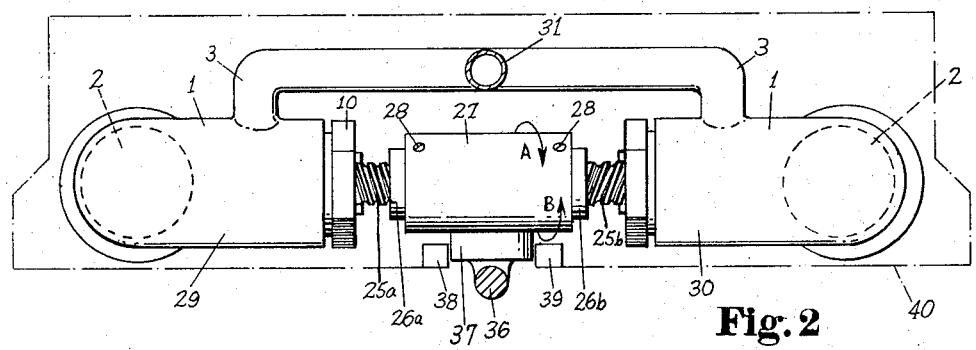
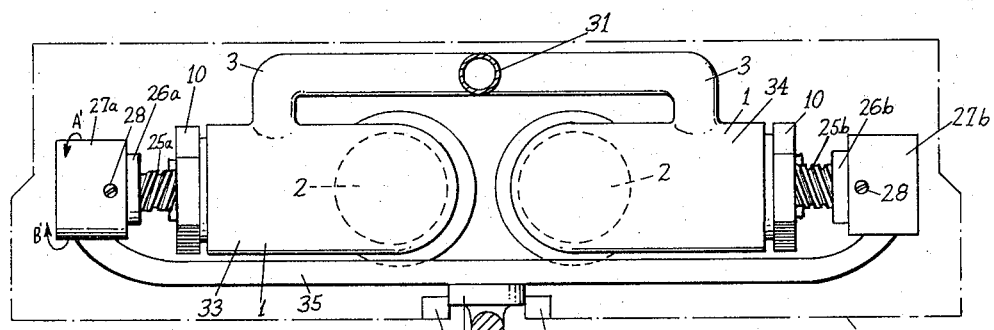
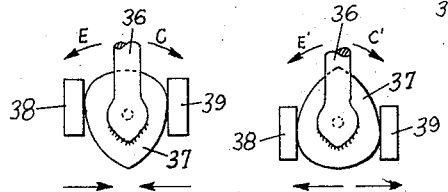
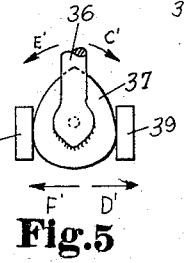

10

United States Patent Office 3,312,247
Patented Apr. 4, 1967

3,312,247
SINGLE HANDLE FAUCET
Ernest C. Browning, 2383 Zollinger Road,
Columbus, Ohio 43221
Filed Sept. 24, 1964, Ser. No. 398,995
9 Claims. (Cl. 137—636.2)

The invention relates to a faucet and more particularly to a faucet of the type having a single manually operated handle adapted not only to regulate the flow of water from full off to full on, but also to regulate the water temperature over the range between all hot and all cold.

The convenience and advantages of such a single-handle faucet have long been known. Prior art faucets of this type, however, have generally been characterized by a complex structure utilizing specially formed parts which are expensive to manufacture. For these reasons, such faucets have often been difficult and expensive to repair and maintain.

Other problems have also been encountered. For example, due to wear and mineral deposits from the water itself, such faucets have been subject to a lack of positive shut-off, and a hot or cold water by-pass. By the latter expression is meant that when such faucets are turned to the full cold position some hot water is still allowed to flow, or vice versa.

It is therefore an object of the present invention to provide a single-handle faucet utilizing a number of parts which are very simple in construction, and some of which are essentially conventional. It is an object of the present invention to provide a single-handle faucet which may be easily and inexpensively manufactured, repaired and maintained.

It is an object of the present invention to provide such a faucet characterized by positive shut off.

It is an object of the present invention to provide a single-handle faucet adapted to materially reduce the possibility of hot or cold water by-pass.

These and other objects of the invention which will be described hereinafter, or will be apparent to one skilled in the art upon reading this specification, are accomplished by that structure and arrangement of parts of which certain exemplary embodiments will now be described. Reference is made to the drawings wherein:

FIGURE 1 is a cross-sectional view of a valve of the present invention.

FIGURE 2 is a plan view of one embodiment of the present invention.

FIGURE 3 is a plan view of another embodiment of the present invention.

FIGURES 4 and 5 illustrate respectively two forms of cam and cam follower arrangements of the present invention.

FIGURE 6 is an isometric view of the faucet of FIGURE 2 with a part in cross-section and including a partial view of the faucet spout.

FIGURE 7 is a perspective view of a handle, cam and cam follower assembly of the present invention.

FIGURES 8, 9 and 10 are respectively a front elevation, a plan view and a rear elevation of an exemplary cover member for the faucet of the present invention.

Briefly, the faucet of the present invention comprises a pair of opposed valves, one connected to a source of hot water, and the other connected to a source of cold water. The outlet sides of these values are connected to a common conduit to which a spout of any suitable type may be affixed. The two valve means of the present invention are mirror images of each other, and each is provided with a seat and a valve element or stem, one end of the valve stem (hereinafter referred to as the opposed end) bearing means adapted to cooperate with the seat. The other ends of the valve stems are operatively connected together by a means whereby the valves may be simultaneously opened or closed, and alternatively opened and closed. Thus, a single manually operated handle adapted to actuate the valve stem connecting means may be used to control both the flow and the temperature of the water dispensed from the faucet.

It will be understood by one skilled in the art that the faucet of the present invention may be used wherever a single handle faucet would be desirable. For example, the faucet of the present invention may be used in connection with a shower, bath tub, lavatory, kitchen sink and the like. For purposes of an exemplary showing, the faucet of the present invention will be described with respect to a kitchen sink installation.

FIGURE 1 illustrates in detail one of the valves of the present invention. The valve comprises a casting 1 of elbow shape (see FIG. 6). The casting has a downwardly disposed inlet end 2 and a laterally disposed outlet 3 with a valve seat located therebetween. The valve seat comprises a web 4 having a central perforation 5, and an annular rim or flange 6 against which the valve element or stem will seat, as will be more fully described hereinafter. The inlet 2 will be affixed to a source of incoming water (not shown) in any suitable way. For example, the inlet 2 may be internally threaded as at 7 (FIG. 6). The casting 1 is also provided with an open end 8, internally threaded as at 9. A bonnet 10, comprising a hollow cylindrical portion 10a and a head 10b with a central perforation 11, is provided with external threads 12 adapted to cooperate with the internal threads 9 at the open end of the casting 1. The head 10b of the bonnet 10 may be of such configuration as to be easily engaged by a wrench or other suitable tool. As shown in FIGURE 6, the head 10b may be hexagonal.

The valve of the present invention is provided with a valve element or stem generally indicated at 13. The stem 13 has a portion 13a of a diameter slightly less than the internal diameter of the portion 10a of the bonnet 10. The stem has a second portion 13b of reduced diameter, adapted to pass freely through the perforation 11 in the head of the bonnet 10.

The portion 13a of the stem terminates in what is herein designated as the opposed end comprising a cup-shaped portion 14 configured to receive a washer 15. The washer 15 is adapted to cooperate with the annular rim or valve seat 6.

It will be understood by one skilled in the art that means must be provided to insure that water flowing past the valve seat exits the valve only via outlet 3. This may be accomplished in any well known and suitable manner, as for example by causing the valve stem to pass through a packing gland. For purposes of an exemplary showing, the portion 13a of the valve stem is illustrated as provided with a pair of annular grooves 17 and 18, for the receipt of O-rings 19 and 20. The O-rings insure a water-tight seal between the valve stem and the inside surface of the bonnet 10.

For reasons given hereinafter, means must also be provided for preventing rotation of the valve element or stem as it moves toward and away from the valve seat. This too may be accomplished by any suitable well known means, as for example by making the perforation 11 in the head 10b of the bonnet and the reduced portion 13b of the stem of non-circular cross-section. For purposes of an exemplary showing, the valve stem portion 13b is shown as provided with keys 21 and 22 adapted to cooperate with slots or key ways 23 and 24 respectively in the head 10b of the bonnet. The remainder of the portion 13b of the stem is threaded with quick acting threads as at 25. An internally threaded nut 26 is provided on the end of the valve stem, and adapted to cooperate freely and easily with the threaded portion 25. The nut 26 is non-rotatively engaged in the end of a hollow sleeve 27. This may be accomplished by any suitable means such as a set screw 28. Thus, when the sleeve 27 is rotated, the nut 26 will rotate with it. The interengagement of the threaded portion 25 of the stem and the internal threads of the nut 26 will normally cause the stem to move toward or away from the valve seat 6, depending upon the direction of rotation of the sleeve 27, since the keys 21 prevent rotation of the valve stem itself.

FIGURE 2 illustrates one embodiment of the faucet of the present invention utilizing two valves 29 and 30, of the type just described. Like parts have been given like index numerals. The valves 29 and 30 differ from each other in only two respects. First, the valve 30 is a mirror image of the valve 29. Second, the threaded portions 25a and 25b on the valve elements or stems (corresponding to the threaded portion 25 in FIG. 1) are of opposite hand, as are the threads of the nuts 26a and 26b (corresponding to the nut 26 of FIG. 1). It will be noted that the outlet 3 of the valves 29 and 30 lead to a common outlet 31. The outlet 31 (see FIG. 6) leads to a spout 32. The spout 32 may be of any suitable type, and for purposes of an exemplary showing is illustrated as the type most often found in association with a kitchen sink, and which is capable of traversing from side to side in a horizontal plane. The common outlet 31 will be provided with suitable means (not shown) to which the spout 32 may be affixed.

The nuts 26a and 26b are non-rotatively held in the ends of the sleeve 27 as by means of the set screws 28. Since the nuts 26a and 26b and the threaded stem portions 25a and 25b are of opposite hand, and since the threads are of the quick acting type, it will be understood that rotation of the sleeve 27 in the direction of the arrow A will cause the valve elements or stems of the valves 29 and 30 to move toward each other (i.e., to open the valves). Similarly, rotation of the sleeve 27 in the direction of the arrow B will cause the valve elements or stems to move away from each other (i.e., to close the valves 29 and 30).

FIGURE 3 illustrates a second embodiment of the present invention, utilizing a pair of valves 33 and 34 similar to the valve illustrated in FIGURE 1. The embodiment shown in FIGURE 3 differs from that shown in FIGURE 2 primarily in the orientation of the valves themselves. Like parts have been given like index numerals.

As in the embodiment of FIGURE 2, the valve elements or stems in FIGURE 3 are coaxial, but in this instance the inlet ends of the valves 33 and 34 face each other. Again, the threaded portions 25a and 25b, and the threaded nuts 26a and 26b are of opposite hand. The nuts 26a and 26b are non-rotatively held in the ends of sleeves 27a and 27b. The sleeves 27a and 27b are joined by a yoke 35, whereby movement of the yoke will cause simultaneous rotation of the sleeves 27a and 27b. Again, by virtue of the threaded nuts 26a and 26b and the threaded portions 25a and 25b having quick acting threads of opposite hand, rotation of the yoke in the direction of the arrow A' will cause the valve stems to move outwardly (i.e., opening the valves 33 and 34 by movement of the opposed ends of the valve elements away from their respective seats). Rotation of the yoke 35 in the direction of the arrow B' will cause the valve stems to move toward each other (i.e., closing the valves 33 and 34). The purpose of this orientation of the valves 33 and 34 is to enable the inlets 2 of these valves to be located as close together as desired. In this instance, the distance between the inlets 2 is determined solely by the length of the yoke 35 and the length of the outlets 3. As will be understood by one skilled in the art, with respect to both the embodiments of FIGURES 2 and 3, the castings 1, the outlets 3, and the common outlet 31 may comprise a single unitary casting. Such castings may be made of any desired dimensions, as may be the yoke 35. Similarly, the sleeves 27a and 27b (FIG. 3) may be integral with the yoke 35.

Referring to FIGURES 2, 4 and 6, a handle 36 is provided in association with the sleeve 27, whereby the sleeve may be rotated in the direction of the arrows A and B. In FIGURES 2 and 6, the handle is shown in an upright or substantially vertical position. The threads 25a and 25b on the stems, and the internal threads of the nuts 26a and 26b are such that when the handle is in this position, the valves are opened. If the handle 36 is pulled forwardly toward the spout 32, the sleeve 27 will be caused to rotate in the direction of the arrow B. Rotation of the sleeve in this direction by a quarter turn or less, will cause the valves to close.

The handle 36 is pivotally affixed to the sleeve 27 by any suitable means, such that the handle is capable of being traversed to the right or to the left in a plane parallel to the axis of the sleeve 27. The handle, at its base, has an oval or substantially heart-shaped cam 37. The cam 37 is adapted to cooperate with a pair of cam followers 38 and 39. As shown in FIGURE 6, the cam followers 38 and 39 are curved so that the cam 37 will be in operative contact with them throughout the range of positions of the handle 36 from full-off to full-on. The cam followers 38 and 39 may be held in position by any suitable means, and for purposes of an exemplary showing they are illustrated in FIGURE 2 as affixed to the cover plate of the faucet mechanism indicated in dot-dash lines at 40.

As will be understood by one skilled in the art, if the handle 36 is moved rearwardly of the spout 32 from a full-closed position, and yet maintained in its centered position with respect to the cam followers 38 and 39, the two valve stems 13 will be moved away from their seats by an equal amount. Thus, if hot water is fed through the valve 29, and cold water through the valve 30, the outlet 31 and spout 32 will deliver an equal mixture of hot and cold water. When the opposed ends of both valve elements have been withdrawn from their seats, the entire valve element sleeve assembly is free to move axially to the right or to the left. Thus, as will be evident from FIGS. 2 and 4, if the handle 36 (when in other than a full-closed position) were traversed in the direction of the arrow C, the valve element-sleeve assembly would be caused to move axially in the direction of the arrow D. Thus, the valve 29 would approach a closed condition (depending upon the amount the handle 36 was traversed in the direction of the arrow C), while the valve 30 would be opened more fully. In this way, the outlet 31 and spout 32 would be caused to deliver colder, or all cold water. Similarly, if the handle 36 were traversed in the direction of the arrow E, the valve element-sleeve assembly would be caused to move axially in the direction of the arrow F. This would result in the valve 30 approaching a closed condition, so that the outlet 31 and the spout 32 would deliver hotter, or all hot water (depending upon the amount by which the handle 36 were traversed in the direction of the arrow E). In this way, it will be seen that the handle 36 when moved in a plane perpendicular to the axis of the valve element-sleeve assembly will cause the faucet of the present invention to be turned on or off. In addition, traversing of the handle 36 in a direction parallel to the axis of the valve element-sleeve assembly will enable a regulation of the temperature of the water issuing from the outlet 31 and spout 32.

In the embodiment shown in FIGURE 3, a handle having a cam, and cam followers, may be provided which are the same as those described with respect to FIGURES 2, 4 and 6. Like parts have been given like index numerals. In this instance, the only difference lies in the fact that the handle 36 is pivotally mounted to the yoke 35. The yoke 35 and its sleeve portions 27a and 27b act in a manner similar to the sleeve 27 of FIG. 2. Thus, the action of the handle 36 with respect to turning the faucet on and off and regulating the water temperature is in all other respects the same as described above.

In many installations, such as in motels, hotels, and the like, separate kitchens and/or bathroms share a common wall so that a single set of hot and cold water service pipes within the wall may serve both rooms. In such instances, however, the controls of the faucets on either side of the wall operate differently because the single set of hot and cold water service pipes enter the faucets on different sides with respect to the orientation of the faucets. Thus, when a single handle faucet is used for example, on one side of the wall cold water may be obtained by traversing the handle to the right, while on the other side of the wall, cold water is obtained by traversing the handle to the left. This can be illustrated with respect to FIGS. 2 and 4. As described above, if valve 30 were fed cold water, and valve 29 hot water, cold water could be obtained by traversing the handle 36 in the direction of arrow C, and hot water could be obtained by traversing the handle in the direction of the arrow E. However, if valve 30 were fed hot water and valve 29 were fed cold water, it will be seen that traversing the handle 36 in the direction of the arrow C would yield hot water instead of cold water, while traversing the handle in the direction of the arrow E would yield cold water instead of hot.

This inconsistency may be cured in the faucet of the present invention by changing the orientation of the cam 37 180° as shown in FIGURE 5. With the cam 37 oriented in this manner, it will be seen from FIG. 5 that movement of the handle in the direction of the arrow C' will now cause the valve stem-sleeve assembly of FIG. 2, to move in the direction of the arrow D'. Similarly, movement of the handle 36 in the direction of the arrow E' will cause the valve stem-sleeve assembly to move in the direction of the arrow F'.

In this way, the single handle faucet of the present invention may be caused to yield cold water when the handle 36 is moved in one direction, and hot water when the handle 36 is moved in the other, irrespective of whether the valves 29 and 30 are connected to the hot or the cold water service pipes. When the cam 37 and the handle 36 are separate elements, the same cam may be used for the assembly of FIG. 4 as for the assembly of FIG. 5. If the cam 37 constitutes an integral part of the handle 36, only the provision of two types of handles (i.e., that shown in FIG. 4 and that shown in FIG. 5), is necessary to provide the faucet of the present invention with the above described versatility.

FIGURE 7 shows an exemplary form of cam follower assembly whereby the cam followers 37 and 39 may be formed in a single, integral unit. As shown, a member 41 having an arcuate cross-section is provided with a central slot 42. The sides of the slot are substantially parallel and constitute cam followers 38' and 39' equivalent to the cam followers 38 and 39 shown in FIGURES 2 through 6. As stated above, the cam followers 38' and 39' are arcuate so that they may cooperate with the cam 37 irrespective of the position of the handle 36 in the plane perpendicular to the axis of the valve stem-sleeve assembly. The member 41 may also be provided with a plurality of threaded perforations 43 for the receipt of bolts (not shown) by which the member 41 may be affixed to the cover plate of the faucet assembly.

FIGURES 8 through 10 illustrate an exemplary form of cover plate for the faucet assembly. The cover plate 44 is provided at its top with a perforation 45 through which the outlet 31 may extend so that the spout 32 may be attached thereto.

As is most clearly shown in FIGS. 9 and 10, the cover plate 44 is also provided with a rear opening 46 through which the handle may extend. The rear opening 46 has an upper portion 47 which extends part way across the top of the cover plate 44. As will be understood, the handle 36 will extend through the opening 47 in the cover plate when the handle is in its forwardmost or closed position. The portion 47 of the rear opening may be tapered as shown in FIG. 9, so as to cause the handle 36 to approach a position parallel to the surfaces of the cam followers as it is moved to its closed position. In this way, the valve stem-sleeve assembly will be centered and equal pressure will be exerted on the seated valve stems when the faucet is turned off.

The rear face of the cover 44 may be provided with a plurality of slots 48 adapted to cooperate with the perforations 43 in the member 41. Thus, when the faucet assembly has been installed the member 41 may be loosely affixed to the cover plate 44 by bolts (not shown) extending through the slots 48 into the perforations 43. By movement of the handle 36 into a full off position, the cam 37 will cause the member 41 to move laterally to its correct position, and thereafter the member 41 may be firmly affixed to the cover plate 44 by tightening the bolts.

Modifications may be made in the invention without departing from the spirit of it.

The embodiments of the invention in which an exclusive property or privilege is claimed are defined as follows:

1. In a device of the character described, a pair of valves which are mirror images of each other, each of said valves comprising a hollow body having an independent inlet means, means providing a valve seat within the body, a valve element extending from a position within the body to a position outside the body, the valve element having on its opposed end means cooperating with said valve seat for regulating fluid flow, and outlet means, the said outlet means being joined together whereby said valves are held in opposed positions with their valve elements in axial alignment, means to prevent rotation of the valve elements in the said bodies, said valve elements being threaded on their other ends with threads of opposite hand, an elongated control member rotatively mounted on said valve elements and having engagement with said threads, and a common means for rotating said control member and for moving said control member and said valve stems axially.

2. The structure claimed in claim 1 wherein said common means for rotating said control member and for moving said control member axially comprises an elongated handle, a cam member at one end of said handle, said last mentioned end of said handle being joined to said control means whereby traversing of said handle in a plane perpendicular to the axes of the valve elements will rotate said control means, said joinder of said handle and said control means being pivoted whereby said handle may be freely traversed in a plane parallel to the axes of the valve elements, cam followers in association with said cam whereby said last mentioned traversing of said handle will move said control member axially.

3. The structure claimed in claim 2 wherein said cam has a first and a second operative orientation whereby, with said cam in said first operative orientation, when said handle is traversed in said plane parallel to said axes of said valve elements the control means will move axially in the opposite direction as said handle, and whereby, with said cam in said second operative orientation, when said handle is traversed in said last mentioned plane said control means will move axially in a direction the same as said handle.

4. The structure claimed in claim 3 including a cover member for said device, said cover member having an opening through which said handle extends, said cam followers being adjustably affixed to said cover member.

5. The structure claimed in claim 1 wherein said other ends of said valve elements extend toward each other, and said control means comprises a sleeve and a pair of nuts having interior threads of opposite hand, one of said nuts engaged on said threaded other end of each of said valve elements, and one of said nuts being removably and non-rotatively engaged in each end of said sleeve.

6. The structure claimed in claim 5 wherein said common means for rotating said control member and for moving said control member axially comprises an elongated handle, a cam member at one end of said handle, said end of said handle being joined to said sleeve, whereby traversing of said handle in a plane perpendicular to the axes of said valve elements will rotate said sleeve, said joinder of said handle and said sleeve being pivotal whereby said handle may be freely traversed in a plane parallel to the axes of said valve elements, cam followers in association with said cam whereby said last mentioned traversing of said handle will move said sleeve axially.

7. The structure claimed in claim 1 wherein said other ends of said valve elements extend away from each other, and wherein said control means comprises a pair of nuts having interior threads of opposite hand, one of said nuts engaged on said threaded other end of each of said valve elements, a pair of sleeves, each of said nuts removably and non-rotatively engaged in one of said sleeves, and a yoke joining said sleeves.

8. The structure claimed in claim 7 wherein said common means for rotating said control member and for moving said control member axially comprises an elongated handle, a cam member at one end of said handle, said end of said handle being joined to said yoke whereby traversing of said handle in a plane perpendicular to the axes of said valve elements will rotate said yoke, said joinder of said handle and said yoke being pivotal whereby said handle may be freely traversed in a plane parallel to the axes of said valve elements, cam followers in association with said cam whereby said last mentioned traversing of said handle will move said yoke axially.

9. A single handle faucet comprising a pair of valves which are mirror images of each other, said valves having hollow body portions, said valves having independent inlet means and connected outlet means, means providing valve seats within said body portions, a pair of axially aligned valve elements having opposed and other ends, means on the opposed ends of said valve elements cooperating with said valve seats for regulating fluid flow, a portion of each of said valve elements being threaded with threads of opposite hand, means threadedly joining the other ends of said valve elements, means for preventing the rotation of said valve elements, means for selectively and simultaneously rotating and shifting said means joining said other ends of said valve elements, whereby rotation of said joining means will cause opposite axial movement of said means cooperating with said valve seats, and shifting of said joining means will cause axial movement of said means cooperating with said valve seats in the same direction.

References Cited by the Examiner

UNITED STATES PATENTS

| 1,641,561 | 9/1927 | Whidden | 137—636.3 |
| 1,893,118 | 1/1933 | Yohe et al. | |
| 2,033,941 | 3/1936 | Kryzanowsky | 137—637.1 |
| 2,038,943 | 4/1936 | LaFountain | 137—636.3 |
| 2,431,290 | 11/1947 | Wildermann | 137—636 X |
| 3,065,007 | 11/1962 | Colmer | 287—60 |

FOREIGN PATENTS

| 243,125 | 1/1961 | Australia. |
| 709,900 | 6/1954 | Great Britain. |

M. CARY NELSON, *Primary Examiner.*

HENRY T. KLINKSIEK, *Examiner.*